United States Patent
Matthews et al.

(10) Patent No.: US 10,735,337 B1
(45) Date of Patent: Aug. 4, 2020

(54) PROCESSING PACKETS IN AN ELECTRONIC DEVICE

(71) Applicant: Innovium, Inc., San Jose, CA (US)

(72) Inventors: William Brad Matthews, San Jose, CA (US); Puneet Agarwal, Cupertino, CA (US); Bruce H. Kwan, Sunnyvale, CA (US); Ajit K. Jain, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 34 days.

(21) Appl. No.: 16/234,677

(22) Filed: Dec. 28, 2018

(51) Int. Cl.
| | |
|---|---|
| *H04L 1/00* | (2006.01) |
| *H04L 12/863* | (2013.01) |
| *H04L 12/835* | (2013.01) |
| *H04L 12/935* | (2013.01) |
| *H04L 12/26* | (2006.01) |
| *H04L 12/823* | (2013.01) |

(52) U.S. Cl.
CPC ............. *H04L 47/50* (2013.01); *H04L 43/16* (2013.01); *H04L 47/30* (2013.01); *H04L 47/32* (2013.01); *H04L 49/30* (2013.01)

(58) Field of Classification Search
None
See application file for complete search history.

(56) References Cited

U.S. PATENT DOCUMENTS

| | | | |
|---|---|---|---|
| 10,277,518 B1 * | 4/2019 | Matthews | ............... H04L 47/56 |
| 10,601,713 B1 * | 3/2020 | Turgeman | ............... H04L 47/62 |
| 2017/0201469 A1 * | 7/2017 | Elias | ................... H04L 43/0817 |

\* cited by examiner

*Primary Examiner* — Clemence S Han
(74) *Attorney, Agent, or Firm* — Fish & Richardson P.C.

(57) ABSTRACT

A network traffic manager receives, from an ingress port, a cell of a packet destined for an egress port. Upon determining that a number of cells of the packet stored in a buffer queue meets a threshold value, the manager checks whether the ingress port has been assigned a token corresponding to the queue. Upon determining that the ingress port has been assigned the token, the manager determines whether other cells of the packet are stored in the buffer, in response to which the manager stores the received cell in the buffer, and stores linking information for the received cell in a receive context for the packet. When all cells of the packet have been received, the manager copies linking information for the packet cells from the receive context to the buffer queue or a copy generator queue, and releases the token from the ingress port.

32 Claims, 4 Drawing Sheets

PROCESSING PACKETS IN AN ELECTRONIC DEVICE

BACKGROUND

This specification relates to processing packets in an electronic device.

Some electronic devices receive network packets through input ports of the devices, for forwarding through output ports of the devices. In some cases, an electronic device temporarily stores packet data in packet buffers, before the packets are transmitted through output ports to external destinations.

SUMMARY

This specification describes packet processing in an electronic device having a number of innovative aspects and related technologies. The electronic device includes one or more ingress ports for receiving network traffic as packets, the ingress ports divided into one or more groups of ingress ports. The electronic device also includes one or more egress ports for transmitting network traffic as packets towards the intended destinations, the egress ports divided into one or more groups of egress ports. An ingress port in this context corresponds to a transmission channel that is associated with a source device, while an egress port corresponds to a transmission channel that is associated with a destination device. Different ingress and egress ports are associated with different transmission channels and the different ports process data for different destinations.

The electronic device further includes one or more traffic managers, each with one or more packet buffers for temporarily storing packet data received from the ingress ports, before they are forwarded for transmission through the egress ports. The following sections describe implementations with respect to an electronic device with a single traffic manager. However, the disclosed techniques are also applicable to an electronic device with multiple traffic managers. In some implementations, a traffic manager includes multiple packet buffers. In some implementations, a traffic manager includes one packet buffer that is divided into multiple buffer partitions. The following sections describe implementations with respect to a single packet buffer with multiple buffer partitions. However, the disclosed techniques are also applicable to a traffic manager with multiple packet buffers, or a packet buffer with a single buffer partition, or both. The traffic manager also includes one or more packet queues, also referred to as queues, for storing linking information for the packet data in the packet buffer. In some implementations, a packet buffer, or a queue, or both, are realized as storage memory.

A traffic manager in the electronic device manages storage of the packet data in the packet buffer and the corresponding linking information in the queues. The traffic manager receives the packet data from the ingress ports in units of data segments, which are referred to as cells, where a packet is composed of one or more cells. The first cell of a packet is referred to as a start of packet (SOP) cell, the last cell is referred to as an end of packet (EOP) cell, while intermediate cells are referred to as middle of packet (MOP) cells. Some packets, e.g., small packets, can have all information within one cell. Such a cell, having both the start and the end of the packet, is referred to as a SEOP cell. The traffic manager evaluates a cell to determine if the cell can be admitted. If the cell can be successfully admitted, then the traffic manager writes the cell to the packet buffer, linking it to other cells of the corresponding packet by storing, in a queue, linking information for the cell, e.g., contextual information that links the cell to the same packet and indicates the position of the cell in the packet. In some implementations, each egress port is associated with a distinct queue in the traffic manager. Upon receiving the EOP cell of the corresponding packet, the traffic manager forwards the cell to a transmit buffer corresponding to the target egress port, or a copy generator queue for replication, or both.

In some implementations, a threshold value is associated with each queue in the traffic manager. The threshold value for a queue provides an upper limit on the number of cells for the corresponding egress port that are to be stored in the packet buffer. When the number of cells linked in a queue reaches or exceeds the threshold value for the queue, the traffic manager drops—instead of storing in the packet buffer—cells of some packets that are to be transmitted through the egress port corresponding to the queue. In some implementations, the traffic manager uses a token to determine which cells to drop. In such cases, each queue has a token. The traffic manager assigns the token for a queue in a particular order to the ingress ports from which cells are received for transmitting through the egress port corresponding to the queue. When the number of cells stored in the queue reaches or exceeds the threshold value for the queue, the traffic manager drops cells that are received from all ingress ports, except one ingress port to which the token is assigned at that time. The traffic manager stores cells received from the ingress port holding the token even after the threshold value is reached or exceeded. In some implementations, the traffic manager stores cells of a packet received from this ingress port after the threshold is reached or exceeded if one or more cells of the packet were already stored in the packet buffer prior to the threshold being reached or exceeded. When all the cells of the packet have been received and stored in the packet buffer, the traffic manager assigns the token to one of the other ingress ports. While this application describes implementations in which tokens are used by the traffic manager to determine whether a packet is eligible to be stored into a buffer, such a token-based policy can also be implemented by other components of an electronic device that manage multiple contenders for shared resources.

In some implementations, the electronic device also includes a multi-copy engine, which replicates packet data for some types of traffic, such as multicast traffic, broadcast traffic, CPU traffic, or for certain specific functions, such as packet mirroring, where the packet data are transmitted through multiple egress ports. In such cases, the multi-copy engine replicates the packet data that indicates how the packet should be de-queued (e.g., linking information) and not the cells themselves. The packet data can be written fewer times (e.g., potentially only once) than the number of queues the data is linked to. In such cases, the multi-copy engine stores, in queues within the engine, metadata for packets that are to be replicated. The metadata is used to link packets to one or more packet queues corresponding to the target egress ports. In some implementations, a threshold value is associated with each internal queue in the multi-copy engine, and the traffic manager assigns a token to each of these internal queues. The threshold value for an internal queue provides an upper limit on the number of packets, or cells, that are to be copied for the particular internal queue. When the threshold for an internal queue is reached, the traffic manager ceases, for storage in this internal queue, metadata for replication of packets that are received from all ingress ports, except for a packet received from an ingress port to which the token corresponding to the internal queue is assigned at that time. When metadata for this packet has been stored in the internal queue, the traffic manager assigns the token for the internal queue to one of the other ingress ports that are sending packets for replication to the corresponding egress port.

The subject matter described in this specification can be realized in particular implementations so as to realize one or more of the following advantages. The threshold value and token-based mechanism employed by the traffic manager for managing the amount of cells and corresponding linking information respectively stored in the packet buffer and the queues ensures that all egress ports are allocated a fair amount of storage space in the packet buffer, while no egress port is starved of traffic when the packet buffer becomes full. This helps to achieve quality of service (QoS) requirements for the network traffic processed by the electronic device, while maintaining fairness in the traffic processing. The data storage mechanisms employed by the traffic manager leads to maximum utilization of the storage space in the packet buffer. In this manner, the traffic manager ensures that the amount of space in the packet buffer is fairly allocated to all active ports, while avoiding starvation of any port.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements. Various embodiments shown in the figures are merely illustrative representations and are not necessarily drawn to scale.

DETAILED DESCRIPTION

Figure 1:
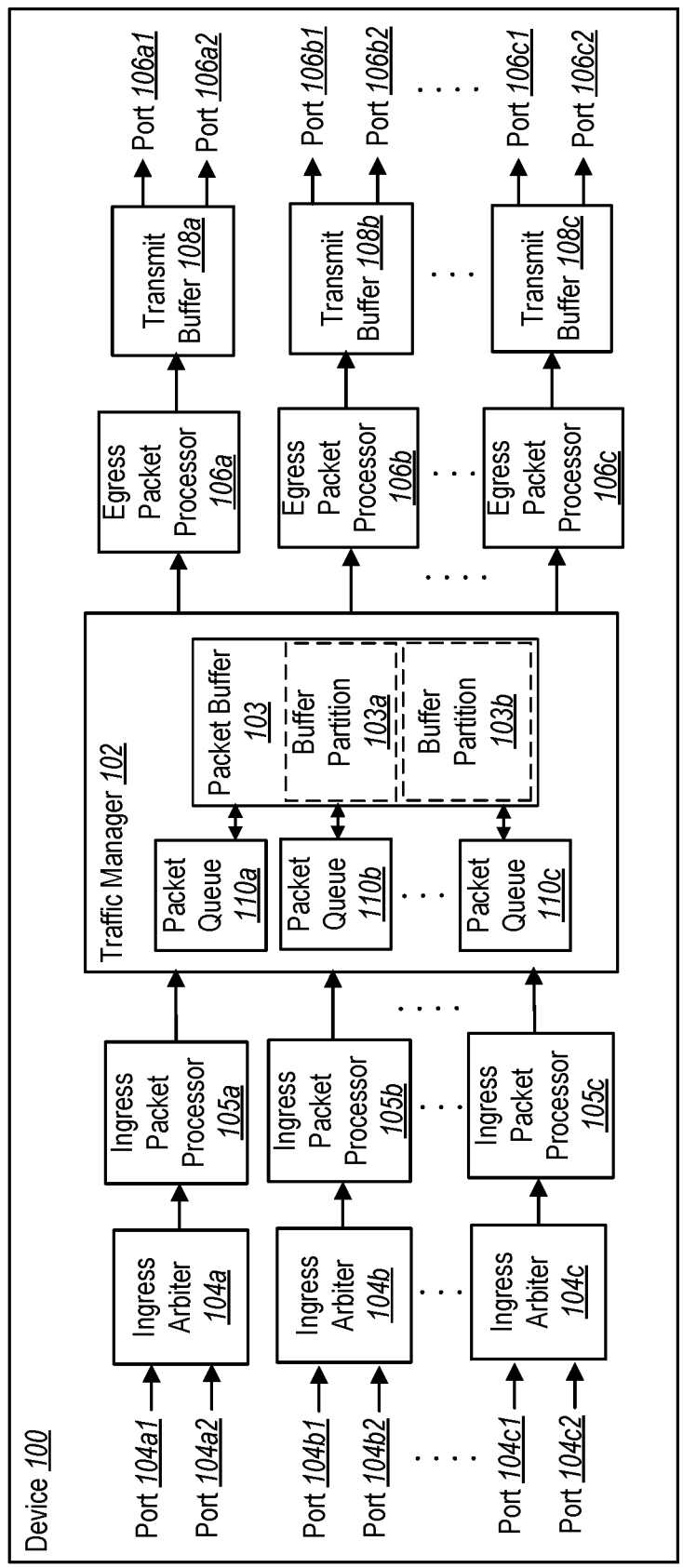
FIG. 1 illustrates an example electronic device that includes a traffic manager.

FIG. 1 illustrates an example electronic device 100 that includes a traffic manager 102. The electronic device 100 also includes ingress arbiters 104a, 104b and 104c, each connecting a different port group of ingress ports to a corresponding ingress packet processor. For example, ingress arbiter 104a connects ingress ports 104a1 and 104a2 of a first ingress port group to ingress packet processor 105a; ingress arbiter 104b connects ingress ports 104b1 and 104b2 of a second ingress port group to ingress packet processor 105b; and ingress arbiter 104c connects ingress ports 104c1 and 104c2 of a third ingress port group to ingress packet processor 105c. The electronic device 100 also includes egress packet processors 106a, 106b and 106c, and corresponding transmit buffers 108a, 108b and 108c, respectively, which connect the egress packet processors to groups of egress ports. For example, egress packet processor 106a is connected through transmit buffer 108a to egress ports 106a1 and 106a2 of a first egress port group; egress packet processor 106b is connected through transmit buffer 108b to egress ports 106b1 and 106b2 of a second egress port group; and egress packet processor 106c is connected through transmit buffer 108c to egress ports 106c1 and 106c2 of a third egress port group. Although FIG. 1 shows separate ingress ports and egress ports, in some implementations, ingress ports and egress ports are physically the same, e.g., a single physical interface that can both send and receive can function as an ingress port and an egress port.

The traffic manager 102 includes a packet buffer 103 and packet queues 110a, 110b and 110c. The packet buffer 103 is used to temporarily store packet data, e.g., cells, before forwarding to the transmit buffers of the target egress ports. In some implementations, the packet buffer 103 is divided in buffer partitions, e.g., buffer partitions 103a and 103b. This is the case, for example, when cells of different traffic types are stored in separate sections of the packet buffer 103. For example, considering unicast and multicast traffic, unicast cells can be stored in buffer partition 103a, while multicast cells can be stored in buffer partition.

In some implementations, each queue corresponds to a distinct egress port. For example, queue 110a can correspond to egress port 106a1, queue 110b can correspond to egress port 106a2, while queue 110b can correspond to egress port 106c2. In such cases, the traffic manager 102 includes at least as many queues as there are egress ports, although only three queues are shown. Each egress port group includes one or more egress ports. For ease of description, the following sections are described with queue 110a corresponding to port 106a1. However, other implementations are possible, with queue 110a being associated with a different egress port. In some implementations, multiple egress queues are associated with each egress port. For example, in some cases, there are at least eight egress queues per egress port.

The electronic device 100 receives packets from various external data sources through the ingress ports connected to the ingress arbiters 104a, 104b or 104c, which are forwarded to the traffic manager 102 in units of cells. The traffic manager 102 stores admitted cells in in the packet buffer 103, linking cells of a packet to one another and to the target egress port by storing linking information in the packet queue corresponding to the target egress port. When all cells of the packet are received, the traffic manager 102 schedules packets to be de-queued for a target report. Once scheduled, the cells stored in the packet buffer 103 are transferred, via the corresponding egress packet processor, to a transmit buffer for the target egress port. As an example, cells of a packet intended for port 106a1 are admitted into the packet buffer 103. When the traffic manager 102 receives the EOP cell of the packet, the traffic manager 102 collects the cells of the packet from the packet buffer 103, using linking information stored in the queue 110a that corresponds to port 106a1, and forwards the cells to the transmit buffer 108a through the egress packet processor 106a. In some implementations, the cells are read from the packet buffer 103 sequentially, e.g., in the order in which the cells were written to the packet buffer 103. In some implementations, the cells are interleaved with cells for other egress ports that have also been scheduled. The cells are subsequently transmitted through the port 106a1.

The traffic manager may transfer a packet in one of two modes: Store & Forward (SAF) or Cut-through (CT). In SAF mode, the traffic manager does not schedule cells for transfer to the transmit buffer until the EOP cell has been received. In CT mode, an arriving packet is eligible to be scheduled for transfer upon reception of the first cell (SOP) into the traffic manager.

In some implementations, the electronic device 100 is a portion of a network device such as a network switch e.g., an Ethernet switch, which includes data sources. In some other implementations, the electronic device 100 is a network device, such as network switch or network interface card (NIC), and data sources are external to the network switch. In either case, the electronic device 100 performs forwarding operations for packet data, e.g., cells, at very high speeds, e.g., potentially on the order of tens of thousands of bits per second (bps), with high efficiency, e.g., minimum buffering and no buffer overflow in the device. In some implementations, the electronic device 100 is a general-purpose processor or a storage device with network traffic forwarding functionality.

The traffic manager with the packet buffer and packet queues, ingress arbiter, ingress and egress packet processors, transmit buffers, and port groups described in this specification can be implemented in a number of technologies. For example, a packet buffer or a packet queue includes components that can be implemented using combinational logic circuitry, e.g., logic gates, flip-flops and registers. A packet buffer or a packet queue also includes memory components that can be implemented using memory chips or fabricated on one integrated circuit with the rest of the packet buffer or the packet queue, respectively. The traffic manager logic can be implemented as a programmed microprocessor, a programmed microcontroller, an application-specific integrated circuit (ASIC), or a programmed processor core or set of processor cores on a larger integrated circuit. A port group can include physical ports or logical ports. A port group includes a set of serializer/deserializer (SERDES) lanes operating at a particular rate, e.g., 10 gigabits per second (Gbps), 25 Gbps, 50 Gbps, or 100 Gbps each. A physical port is associated with one or more SERDES lanes. For example, a 100 Gbps port can be associated with ten 10 Gbps lanes, four 25 Gbps lanes, two 50 Gbps lanes, or one 100 Gbps lane, depending on the underlying SERDES technology used. Similar to a physical port, a logical port is also associated with a destination; however, a logical port includes multiple physical connections to the destination. A logical port can be represented as one or more physical ports. A logical port can be bound to one or more aggregate port buffers. This specification describes operations performed by these and related components in various implementations of the components, and refer to the components as being "configured to" perform the operations. This should be understood to mean that the components include hardware, firmware, software, circuitry, or a combination of them that in operation cause the components to perform the operations.

In some implementations, different port groups have different numbers of ports. For example, a port group can have a single port, or four ports, or 10 ports. The ports in a port group can be changed during runtime, while traffic is being transmitted through other port groups. For example, a port group can initially include four ports, each of data rate 10 Gbps. During runtime, the port group can be reconfigured to include two ports, each of data rate 20 Gbps, or one port with data rate 30 Gbps and the second port with data rate 10 Gbps. Alternatively, the port group can be reconfigured to include three ports, one port with data rate 20 Gbps, and each of the remaining two ports with data rate 10 Gbps. In some implementations, each egress port group is associated with a different destination. In some implementations, the destination is another electronic device, e.g., another Ethernet switch, or a peripheral device, such as a packet processor.

Network traffic packets for various communications channels are received at the electronic device 100 through one or more ingress ports, e.g., ingress ports 104$a$1, 104$b$1, or 104$c$1, among others, for forwarding towards their respective destinations through one or more egress ports, e.g., egress ports 106$a$1, 106$b$1 or 106$c$1, among others. While waiting to be forwarded to the transmit buffers for transmission through the egress ports, the traffic manager 102 temporarily stores packet data, e.g., cells, in the packet buffer 103, linking the cells to one another and to the target egress port using linking information stored in a queue, e.g., queue 110$a$ or 110$b$, corresponding to the target egress port. For example, in some implementations, a communications channel is established through the electronic device 100 connecting ingress port 104$a$1 and egress port 106$a$1. In such cases, the traffic manager 102 stores SOP and MOP cells of packet data received through ingress port 104$a$1 and destined for egress port 106$a$1 in the packet buffer 103, linking the cells to one another by storing linking information in the queue 110$a$. When the traffic manager 102 receives the EOP cell of the packet, the traffic manager forwards the SOP, MOP and EOP cells through the egress packet processor 106$a$ to the transmit buffer 108$a$, where the cells are stored in a egress queue before being transmitted out through the port 106$a$1.

In some implementations, multiple ingress ports, from the same or different port groups, have communications channels connected to the same egress port. For example, both ingress ports 104$a$1 and 104$a$2 can have communications channels through the egress port 106$a$1. In such cases, the traffic manager 102 stores cells of packets received through ingress ports 104$a$1 and 104$a$2, and destined for egress port 106$a$1, in the packet buffer 103, with the linking information for the cells being stored in queue 110$a$ corresponding to port 106$a$1 in an interleaved manner, before all the cells of a particular packet are forwarded to the transmit buffer 108$a$. Additionally, ingress port 104$b$1 can have a communication channels through the egress port 106$a$1. In such cases, the traffic manager 102 stores in an interleaved manner linking information for cells of packets received through ingress port 104$b$1, and destined for egress port 106$a$1, in the queue corresponding to port 106$a$1, before forwarding to the transmit buffer 108$a$ through the egress packet processor 106$a$.

In some implementations, an ingress port has communications channels connected to multiple egress ports, from the same or different port groups. For example, ingress port 104$a$1 can have communications channels through the egress ports 106$a$1 and 106$a$2. In such cases, the traffic manager 102 stores cells of packets received through ingress port 104$a$1, and destined for egress ports 106$a$1 and 106$b$1, in the packet buffer 103, and the linking information for the cells in respective queues corresponding to ports 106$a$1 and 106$b$1, before forwarding the cells to the respective transmit buffers 108$a$ and 108$b$.

In some implementations, the traffic manager 102 maintains a single queue for each egress port. In such cases, the traffic manager 102 stores linking information for cells corresponding to different types of traffic destined for an egress port in the single queue corresponding to the egress port. Different types of traffic can include data traffic, control traffic such as central processing unit (CPU) traffic, unicast, broadcast, or multicast traffic, or traffic with different data rates. In some implementations, the traffic manager 102 maintains multiple queues for each egress port, e.g., different queues for different traffic types. In such cases, the traffic manager 102 stores linking information for cells of packets corresponding to different types of traffic destined for an egress port in the respective queues of the egress port that are configured for the respective traffic types.

In some implementations, priorities or weights are associated with the traffic, with different traffic types having different priorities. For example, packet data for traffic with a guaranteed minimum QoS can have a higher priority compared to packet data for traffic without a QoS guarantee. In such implementations, the traffic manager 102 stores packet metadata, e.g., linking information for cells, in the queues along with respective priority values. Packet metadata can be stored with priority values in implementations with single queues, or with multiple queues. In some implementations, the traffic manager will process, e.g., forward to the transmit buffer corresponding to the target egress port, cells with a higher priority earlier than cells with lower or no priority.

In some implementations, the traffic manager 102 associates a threshold value with each queue. The threshold value represents an upper limit on the amount of data, e.g., number of cells, for which linking information can be stored in the queue at a time, with the cells being stored in the packet buffer 103. For every queue, the traffic manager 102 uses a counter that increments per unit amount of data stored in the queue. In some implementations, the counter is incremented by one, e.g., for every cell that is stored in the queue. In some implementations, the counter is incremented by more than one, e.g. based on a number of bytes in a cell that is stored in the queue. In some implementations, the counter is incremented by one for every packet, e.g., when all cells of the packet are stored in the queue. Generally, incrementing the counter depends on a policy that is based on how accounting is performed. The policy can be based on device capabilities, e.g., it may only support cell-based accounting, or can be based on user configuration, e.g., a device user may select byte-based accounting. In some implementations, there are multiple counters, e.g., corresponding to counting cells, bytes, or packets, or any combination thereof. In such cases, different threshold values can be used for each type of counter. The techniques disclosed herein are described with respect implements using a counter that increments by one for every cell that is stored in the queue. However, the techniques are also applicable to implementations that use other types of counters, e.g., incrementing based on bytes or packets, or implementations that use multiple counters of different types.

Continuing with the previous example of a counter used by the traffic manager 102, when the counter value for a queue reaches the threshold value for the queue, additional cells that are received by the traffic manager 102 are dropped. For example, in some implementations, the queue 110a has a threshold value for linking 20 cells, which indicates that up to 20 cells for port 106a1 can be stored in the packet buffer 103 at a time and linked by the queue 110a. When 20 cells for port 106a1 are stored in the packet buffer 103, the traffic manager drops additional cells that are received for port 106a1.

In some implementations, some or all of the queues have different threshold values. For example, the queues 110a and 110c can have a threshold value of 20 cells each, while the queue 110b can have a threshold value of 30 cells and another queue can have a threshold value of 25 cells. In some other implementations, all the queues have the same threshold value. For example, the queues 110a, 110b and 110c can each have a threshold value of 20 cells.

In some implementations, the threshold values are static. In such cases, the threshold value for a queue is set once, e.g., by a device programmer or administrator, and does not change during operation. In other implementations, the threshold values are dynamic. In such cases, the threshold for a queue can change during device operation, e.g., depending on the amount of traffic for the egress port corresponding to the queue. The threshold value in such cases can be dynamically adjusted by the traffic manager 102.

Setting threshold values for different queues ensure fairness, such that no single queue for an egress port can take up all the storage space in the packet buffer 103. This can happen, for example, when there is a high data rate traffic flow through one egress port and lower data rate traffic flows through other egress ports. Packets for the high data traffic flow can arrive much more rapidly compared to packets for the lower data rate traffic flows, and therefore cells of the high data rate packets can fill up the storage in the packet buffer 103, unless threshold values for the queues, which indicate the maximum number of cells for the corresponding egress ports that can be stored in the packet buffer 103, are enforced.

In some implementations, the threshold value of a queue is determined to prevent bandwidth under-utilization, while avoiding excessive consumption of packet buffer resources by one egress port as noted above. A low threshold value for a queue would result in the threshold being reached with few cells for the corresponding egress port stored in the packet buffer, such that most cells destined for the egress port are dropped, leading to bandwidth underutilization of the egress port. In contrast, as noted above, a high threshold value would result in a large number of cells stored in the packet buffer before the threshold is reached, leading to cells for the corresponding egress port consuming a large portion of the packet buffer 103, potentially displacing storage space for cells of other egress ports. Accordingly, the threshold value for each queue is determined to be in between these extremes. In some implementations, a guarantee is provided for a queue to prevent under-utilization. However, such a guarantee is not used to perform drops. In such cases, the queue optionally has a threshold that is used to determine if cells are to be dropped.

In some implementations, the traffic manager 102 does not drop all cells for an egress port after the threshold value for the corresponding queue is reached. Instead, the traffic manager 102 implements a token-based mechanism to determine which cells to drop. In some of these implementations, the traffic manager 102 provides a token to each queue. At a given time, the token for a queue is assigned to one of the ingress ports from which packet data is received for the egress port corresponding to the queue. At a time when the threshold value for the queue is reached, the traffic manager allows cells corresponding to a packet received from the ingress port that is holding the token at that time to be stored in the packet buffer 103, while dropping cells received from all other ingress ports that are destined for the egress port corresponding to the queue. All cells of other packets destined for the egress queue are dropped, including cells of packets that were previously admitted but have not yet completely arrived (e.g., whose EOP cells have not arrived and been stored in the buffer). In some other implementations, the traffic manager 102 provides a token to a port, or a group of queues that is bound to a port.

As an example, in some implementations, ingress ports 104a1, 104a2 and 104b1 send traffic for transmission through egress port 106a1. The traffic manager 102 stores linking information for cells, e.g., contextual information to link the cells of the same packet, of packets received from ingress ports 104a1, 104a2 and 104b1, and destined for egress port 106a1, in the queue 110a. Upon storing the linking information for each cell in the queue 110a, the traffic manager 102 increments a counter for the queue 110.

By incrementing the counter upon storing linking information for the cells in the queue 110a, the threshold value for queue 110a (e.g., 20 cells) can be reached, e.g., when the rate of arrival of packets is higher than the rate at which the packets can be transmitted out through the egress port 106a1. When the counter indicates that the threshold value for the queue 110a has been reached (e.g., there are 20 cells in the packet buffer 103 with linking information stored in the queue 110a), the traffic manager 102 checks and determines that the token for the queue 110a is currently assigned to, e.g., ingress port 104a2. Following this determination, when the traffic manager 102 receives additional cells of the packet from the ingress port 104a2, the traffic manager stores these additional cells in the packet buffer 103 and linking information in the queue 110a, even though the threshold value for the queue 110a has been reached. Accordingly, by using the token-based mechanism to store cells, the number of cells linked in a queue can exceed the threshold value for the queue. However, when additional cells of packets from the ingress ports 104a1 and 104b1 are received, the traffic manager 102 drops these cells, since neither of these ingress ports is holding the token at that time. Additionally, in some implementations, since the packets received from the ingress ports 104a1 and 104b1 is corrupted upon dropping cells of these packets, the traffic manager 102 also discards other cells of these packets, e.g., SOP cells and MOP cells that have already been stored in the packet buffer 103. When all the cells of the packet from the ingress port 104a2 have been received and stored in the packet buffer 103, the traffic manager 102 releases the token from the ingress port 104a2 and assigns the token to one of the other ingress ports.

For each egress port, the traffic manager 102 checks each ingress port group for incoming traffic in some order. In some implementations, the traffic manager 102 does round robin polling among port groups when the traffic behavior is predictable. In some implementations, the traffic manager 102 periodically changes the order in which port groups are polled, e.g., by flipping a coin, to introduce randomness when the traffic received from the different ingress ports vary with time.

Randomization in polling different ingress port groups, or different ingress ports, can be introduced in various ways. In some implementations, the traffic manager 102 uses a countdown timer. The timer counts down to a set value, e.g., a time period or number of clock cycles; once the timer expires, the traffic manager 102 shuffles the round robin polling order of the ingress port groups, or the ingress ports within a group. The traffic manager 102 also resets the timer and starts a new countdown. In some implementations, when resetting the timer, the traffic manager uses a random number generator to set the timer to a different countdown value, e.g., a new time period or a new number of clock cycles.

In some implementations, the randomization is based on the total number of cell arrivals for a particular queue. In such cases, the traffic manager 102 counts the total cell arrivals; when the count reaches a target value, the traffic manager 102 shuffles the round robin polling order of the ingress port groups, or the ingress ports within a group. The traffic manager 102 also resets the cell arrival count and starts a new count. In some implementations, when resetting the arrival count, the traffic manager uses a random number generator to randomly set the target to a different value for the number of arrivals.

Within an ingress port group, the traffic manager assigns the token for the corresponding queue to ingress ports for a default minimum period of time. In some implementations, each ingress port within an ingress port group is assigned the token for the default minimum period. In some implementations, the traffic manager 102 performs arbitration among the ingress ports in an ingress port group, assigning the token only to the ingress ports that are actively sending traffic for the corresponding egress port. If an ingress port that is assigned the token does not have packet data to send, the traffic manager 102 releases the token from the ingress port after the default minimum period. However, if an ingress port that is assigned the token is sending packet data, the traffic manager 102 maintains token assignment to that ingress port until all cells of the packet have been received. Accordingly, the actual amount of time that an ingress port can hold on to a token for a queue can vary from one ingress port to another ingress port, depending on the amount of packet data being sent by the ingress ports. An ingress port that sends a packet with a larger payload, and therefore a greater number of cells, may hold on to the token for a longer period of time compared to an ingress port that sends a packet with a smaller payload, and therefore a smaller number of cells.

In some implementations, when the threshold value for a queue is reached, the traffic manager 102 stores additional cells of a packet received from an ingress port holding the token corresponding to the queue, provided one or more cells of the packet are already stored in the packet buffer 103 before the threshold value is reached. Continuing with the example described above, when the threshold value for queue 110a is reached and the traffic manager 102 determines that the token for the queue 110a is currently assigned to ingress port 104a2, the traffic manager 102 further checks whether one or more cells of the packet, e.g., SOP cells and MOP cells, received from ingress port 104a2 are already stored in the packet buffer 103 with linking information in the queue 110a. In some cases, the traffic manager 102 determines that it has already stored, one or more cells of the packet received from ingress port 104a2 before the threshold is reached, and accordingly the traffic manager accepts additional cells of the packet from the ingress port 104a2 and stores these additional cells. However, in some other cases, the traffic manager determines that no cell of a packet received from ingress port 104a2 has been stored in the packet buffer 103 by the time the threshold value for the queue 110a is reached, e.g., when an SOP cell of a packet destined for the egress port 106a1 is received from the ingress port 104a2 only after the threshold value for queue 110a is reached, where the ingress port 104a2 is holding the token for the packet data 110a at the time the threshold value is reached. In such cases, the traffic manager 102 drops the cells received from the ingress port 104a2 after the threshold value is reached, even though the ingress port 104a2 is holding the token for the packet data 110a at the time the threshold value is reached.

When the threshold value for a queue is reached, the traffic manager 102 drops additional cells of packets received from ingress ports that are not holding the respective token, until the numbers of cells stored in the packet buffer goes down below the respective threshold value, e.g., due to cells being forwarded to the transmit buffer for transmission through the corresponding egress port. At that time, the traffic manager 102 stores additional cells of packets received from all ingress ports until the threshold value for the queue is again reached.

In the above manner, by managing storage of cells using a token-based mechanism, the traffic manager 102 ensures that an egress port is not starved of traffic when the threshold for its queue is reached. For example, when the threshold is reached, instead of dropping cells from all ingress ports, cells from at least one ingress port (e.g., the ingress port holding the token for the queue) is allowed to be admitted and stored in the packet buffer, and subsequently forwarded to the transmit buffer of the egress port.

The disclosure above details storage of cells corresponding to unicast packets in the queues in the packet buffer 103. In some implementations, other types of packets, e.g., multicast, broadcast or mirrored packets, are stored in a similar manner in the queues in the packet buffer 103. However, in other implementations, packets that are replicated, e.g., multicast, broadcast or mirrored packets, are stored in queues in a multi-copy engine, as described in greater detail with respect to electronic device 200 in FIG. 2 below.

In some implementations, in addition, or as an alternative, to the queues 110a, 110b and 110c, a threshold value, and a corresponding token, is associated with the packet buffer 103. In such cases, the threshold and token-based techniques described herein with respect to the queues are applicable to the packet buffer 103. For example, the token is assigned to an ingress port at a time. When the threshold value for the packet buffer 103 is reached, incoming cells from all ingress ports are dropped, except for cells corresponding to packets received from the ingress port that is holding the token. In some implementations, different threshold values and corresponding tokens are associated with different buffer partitions, e.g., buffer partitions 103a and 103b. In such cases, the threshold and token-based techniques described herein are applied individually to each buffer partition. In some implementations, the threshold and token-based techniques are used concurrently for the queues and the packet buffer 103, or for the queues and the different buffer partitions.

Figure 2:
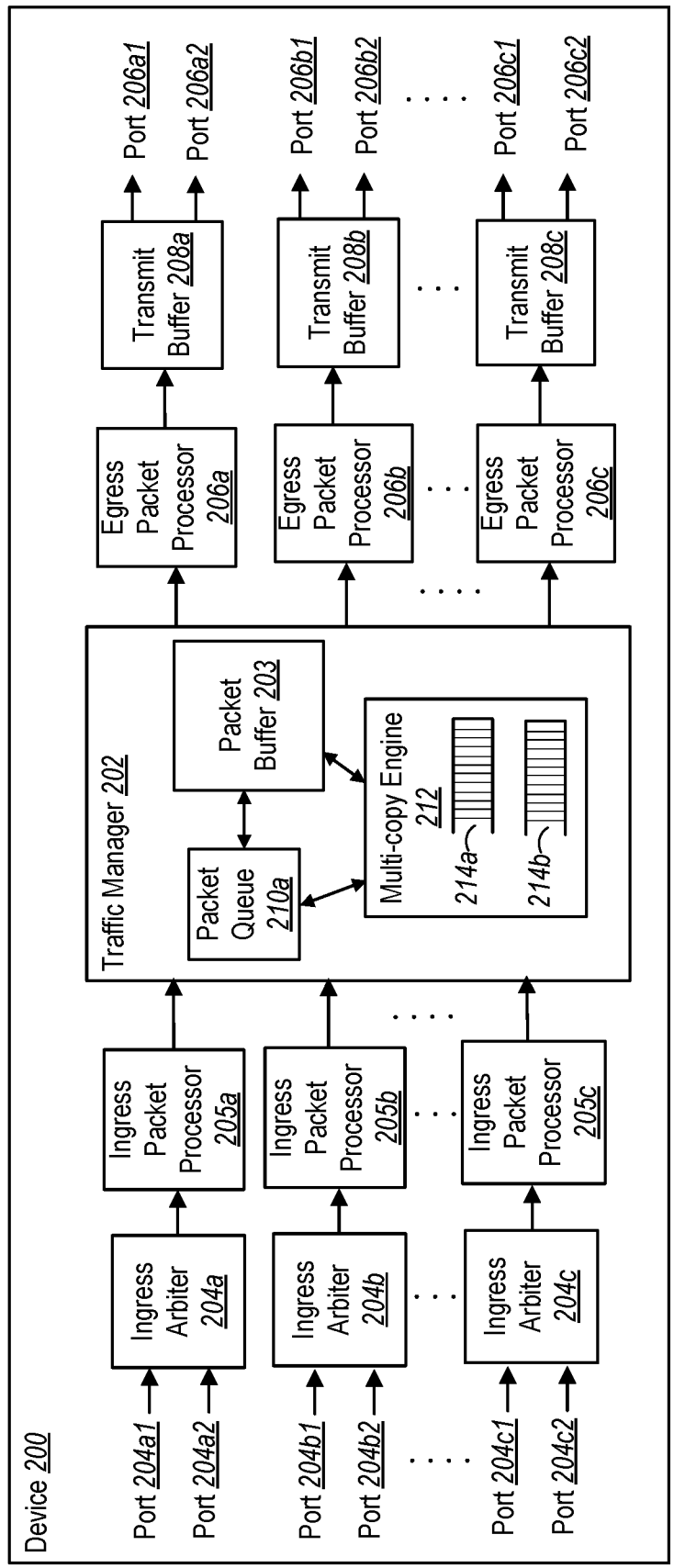
FIG. 2 illustrates an example electronic device that includes a traffic manager with a multi-copy engine.

FIG. 2 illustrates an example electronic device 200 that includes a traffic manager 202 with a multi-copy engine 212. The electronic device 200 also includes ingress arbiters 204a, 204b and 204c. Each ingress arbiter connects a group of ingress ports to an ingress packet processor. For example, ingress arbiter 204a connects ingress ports 204a1 and 204a2 of a first ingress port group to ingress packet processor 205a; ingress arbiter 204b connects ingress ports 204b1 and 204b2 of a second ingress port group to ingress packet processor 205b; and ingress arbiter 204c connects ingress ports 204c1 and 204c2 of a third ingress port group to ingress packet processor 205c. The electronic device 200 further includes egress packet processors 206a, 206b and 206c that are connected to the traffic manager 202. Each egress packet processor is connected to an egress port group through a transmit buffer. For example, egress packet processor 206a is connected through a transmit buffer 208a to egress ports 206a1 and 206a2 of a first egress port group; egress packet processor 206b is connected through a transmit buffer 208b to egress ports 206b1 and 206b2 of a second egress port group; and egress packet processor 206c is connected through a transmit buffer 208c to egress ports 206c1 and 206c2 of a third egress port group.

The traffic manager 202 includes a packet buffer 203, a packet queue 210a, and a multi-copy engine 212. In some implementations, the traffic manager 202 includes multiple packet queues, although only one queue 210a is shown. In some implementations, the packet buffer 203 is partitioned into multiple buffer partitions. The multi-copy engine includes one or more copy-generator queues, such as queues 214a and 214b.

The electronic device 200 receives packets from various external data sources through the ingress ports; stores the packet data in units of cells in in the packet buffer 203, with linking information for the cells stored in the queue 210a; and forwards the cells to respective destinations through the egress ports. In some implementations, each egress port has a corresponding queue in the traffic manager 202. For example, in some implementations, queue 210a corresponds to egress port 206a1, and stores unicast packet data that are destined to be transmitted through egress port 206a1. Other queues correspond to other egress ports and function in a similar manner as the queue 210a.

In some implementations, the electronic device 200 is similar to the electronic device 100 and performs functions that include functions performed by the electronic device 100, as described above. In such implementations, the traffic manager 202 performs functions that include functions similar to those performed by the traffic manager 102. The packet buffer 203 provides features including features similar to those provided by the packet buffer 103, e.g., buffer partitions. The queue 210a and other queues in the traffic manager 202 have features that include features similar to those provided by the queues 110a, 110b and 110c.

Additionally, the traffic manager 202 provides functionality of the multi-copy engine 212, which is used to replicate packets that are to be transmitted through multiple egress ports, e.g., multicast or broadcast packets, or packets that are mirrored. For example, the multi-copy engine 212 is used to generate additional copies of a multicast packet that is received from one ingress port, e.g., ingress port 204a1, and is to be transmitted out through two or more egress ports, e.g., egress ports 206a1, 206b1 and 206c1. The multi-copy engine 212 is also used to replicate broadcast packets, e.g., packets that are received from one ingress port and are to be transmitted out through all egress ports. The multi-copy engine 212 is further used for packet mirroring. The multi-copy engine 212 is responsible for enqueuing any packet that requires multiple copies of the packet to be made. For example, copies may be required for multicast packets, mirror packets, or copies to internal ports, e.g. CPU, recirculation, or diagnostic.

In some implementations, the multi-copy engine 212 replicates packets by making copies of the linking information for the cells. As an illustrative example, in such cases, cells of a multicast packet received from an ingress port and destined for egress port 206a1 are stored in the packet buffer 203, with the linking information for the cells stored in packet queue 210a. The multicast packet may also be sent to egress ports 206b1 and 206c1. The multi-copy engine 212 copies the linking information for the multicast cells from the queue 210a, and writes the copied linking information into queues for the ports 206b1 and 206c1.

The copy generator queues 214a and 214b store metadata for cells whose additional copies have not been generated yet. Copy Generator queues can be provided for every enqueue source or every <enqueue source, packet copy type> association, where the packet copy type can be defined by a user based on packet fields. In some implementations, cell metadata for packets of different types are stored in different copy generator queues. For example, metadata for multicast cells are stored in one copy generator queue, e.g., 214a, while metadata for broadcast packets are stored in a different copy generator queue, e.g., 214b. Packets that are to be mirrored, e.g., for CPU traffic, are stored in a third copy generator queue. Although only two copy generator queues 214*a* and 214*b* are shown, the multi-copy engine 212 can include additional copy generator queues, e.g., one or more copy generator queues per traffic type that is to be replicated.

In some implementations, the traffic manager 202 assigns a threshold value to each copy generator queue, where the threshold value represents an upper limit on the maximum number of cells pending replication for which metadata can be stored in that copy generator queue. The traffic manager 202 also associates a separate token for each copy generator queue, and assigns the token to one of the ingress ports at a given point in time.

When the threshold value for a copy generator queue is reached, the traffic manager 202 checks which ingress port is holding the corresponding token at that time. The traffic manager accepts, for storage in the particular copy generator queue, metadata for cells corresponding to a packets that are received only from the ingress port holding the corresponding token at the time the threshold value for the copy generator queue is reached. Metadata for cells corresponding to packets that are received from all other ingress ports are dropped.

As an illustrative example, in one implementation, the traffic manager 202 receives packets from ingress port 204*a*1 for multicast through egress ports 206*a*1, 206*a*2 and 206*b*1, and also receives broadcast packets from ingress port 204*b*1. The traffic manager 202 stores cells of each multicast packet received from ingress port 204*a*1 in the packet buffer 203, and corresponding linking information in a queue of one of the target egress ports, e.g., queue 210*a*. When cells of a complete multicast packet have been received and stored in the packet buffer 203, the traffic manager 202 copies linking information from the queue 210*a* into one of the copy generator queues that stores multicast cell metadata for replication, e.g., queue 214*a*. The traffic manager 202 also stores cells of each CPU mirroring packet (or any other suitable packet type) received from ingress port 204*b*1 in the packet buffer 203, e.g., in a different buffer partition depending on the implementation, and the corresponding linking information in a queue of the one of the egress ports. When cells of a complete CPU mirroring packet have been received and stored, the traffic manager 202 copies the linking information from the egress port queue into one of the copy generator queues that stores CPU mirroring cell metadata for replication, e.g., queue 214*b*.

In some cases, the threshold value for the queue 214*a* is reached when the number of multicast cells awaiting replication reaches the threshold number for queue 214*a*. In such cases, upon receiving additional cells of multicast packets from ingress port 204*a*1, the traffic manager 202 checks whether the token for the queue 214*a* is currently held by ingress port 204*a*1. If the traffic manager 202 determines that the token for the queue 214*a* is currently held by ingress port 204*a*1, then the traffic manager stores the additional cells in the packet buffer 203, the corresponding linking information in the queue 210*a*, and copies the linking information into the queue 214*a*. However, if the traffic manager 202 determines that the token for the queue 214*a* is not currently held by ingress port 204*a*1, then the traffic manager drops the additional cells of multicast packets that are received from ingress port 204*a*1.

In a similar manner, in some implementations, the traffic manager 202 stores cells of CPU mirroring packets that are received from ingress port 204*b*1 in the packet buffer 203 and the corresponding linking information in queue 214*b* until the threshold value for the queue 214*b* is reached. At that time, additional cell metadata of CPU mirroring packets from ingress port 204*b*1 are stored in the queue 214*b* only if the token for the queue 214*b* is held by the ingress port 204*b*1 at that time; otherwise, the additional cells received from ingress port 204*b*1 are dropped. Similar token-based mechanisms are employed by the traffic manager for storing other packet types for replication in the multi-copy engine 212.

The traffic manager 202 continues dropping additional cells for replication received from ingress ports that are not holding the respective copy generator queue tokens, until the numbers of cell metadata stored in the corresponding queues go down below the respective threshold values, e.g., due to the processing of the stored cell metadata. At that time, the traffic manager 202 stores additional linking information for additional cells for replication in the copy generator queues in the multi-copy engine 212 until the threshold values are reached.

In some implementations, the traffic manager 202 assigns the token for a copy generator queue to each of the ingress port groups, or to an ingress port in a port group, in a similar manner as done with tokens for the unicast packets, as described with respect to the traffic manager 102. In such implementations, the traffic manager 202 periodically refreshes, e.g., in a random manner as described with respect to traffic manager 102, the order in which the different ingress port groups, or ingress ports within a group, are assigned the token for a copy generator queue.

Figure 3:
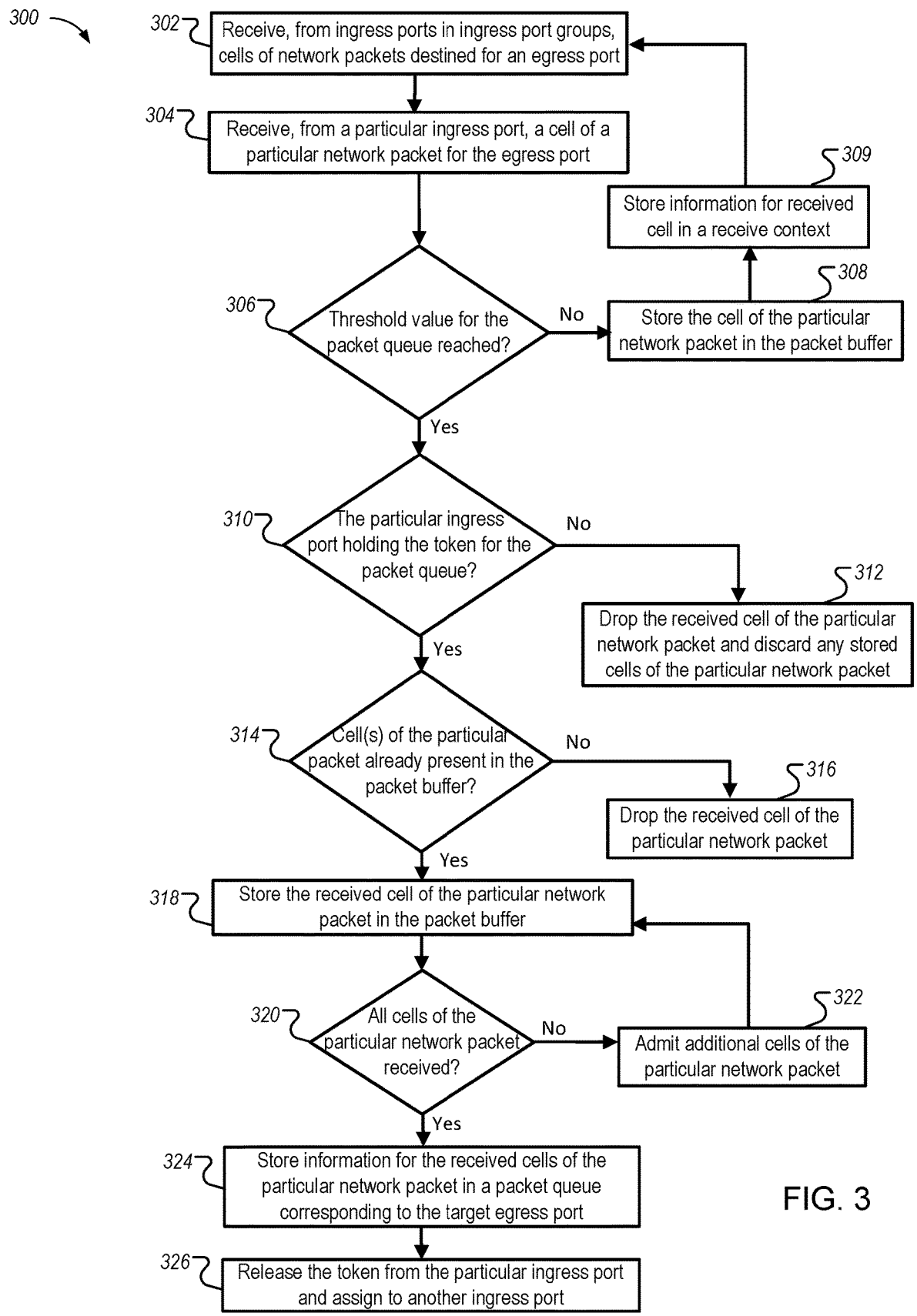
FIG. 3 illustrates an example process to store packet data in a packet buffer using tokens to manage queues.

FIG. 3 illustrates an example process 300 to store packet data in a packet buffer using tokens to manage queues. In some implementations, the process 300 is performed by the traffic manager 102 when storing cells of packets received from ingress ports. Accordingly, the following sections describe the process 300 with respect to the traffic manager 102. However, in other implementations, the process 300 may be performed by other systems or devices.

The process 300 starts when the traffic manager receives, from ingress ports in ingress port groups, cells of network packets destined for an egress port (302). For example, the traffic manager 102 receives, from ingress ports 104*a*1 and 104*a*2 in, cells of network packets destined for egress port 106*a*1. The traffic manager 102 also receives, from ingress port 104*b*1, cells of other network packets destined for egress port 106*a*1.

The traffic manager receives, from a particular ingress port, a cell of a particular network packet for the egress port (304). For example, the traffic manager 102 receives, from ingress port 104*a*1, a cell of a particular network packet destined for egress port 106*a*1.

The traffic manager checks whether the threshold value for the packet queue is reached (306). For example, upon receiving a cell of the particular network packet from the particular ingress port, the traffic manager 102 checks whether the threshold value for the queue 110*a* is reached. In some implementations, the traffic manager 102 compares the value of the counter for the queue 110*a* to a known threshold value for the queue 110*a*. In some implementations, the traffic manager performs the check for each received cell of the packet.

If the threshold value for the queue is not reached, then the traffic manager stores the cell of the particular network packet in the packet buffer (308). For example, if the traffic manager 102 determines that the value of the counter for the queue 110*a* is less than the threshold value for the queue 110*a*, then the traffic manager 102 stores, in the packet buffer 103, the cell of the particular network packet received from the ingress port 104*a*1 for the egress port 106*a*1.

The traffic manager stores information for the received cell in a receive context (309). For example, upon storing a cell of the particular network packet received from the ingress port 104a1 for the egress port 106a1 in the packet buffer 103 (308), the traffic manager 102 stores the linking information for the cell in a receive context corresponding to the ingress port 104a1. The receive context maintains information that is used to link all stored cells of the packet once the EOP cell arrives. The traffic manager 102 then increments the counter value for the queue 110a by one. In this manner, the traffic manager 102 stores cells of network packets received from ingress ports 104a1 and 104a2 destined for egress port 106a1 in the packet buffer 103, and the linking information for these cells in receive contexts that correspond to respective ingress ports. The traffic manager 102 also stores cells of network packets received from ingress port 104b1 in the packet buffer 103, and the linking information for these cells in a receive context. Upon storing linking information for each cell in a receive context, the traffic manager 102 increments a counter. Information for each received cell is stored in a receive context until all cells have arrived and been accepted. At that time, the information required for linking is linked to the queue.

On the other hand, if the threshold value for the queue is reached (306), then the traffic manager checks whether the particular ingress port is holding the token for the queue (310). For example, if the traffic manager 102 determines that the value of the counter for the queue 110a is equal to, or greater than, the threshold value for the queue 110a, then the traffic manager 102 checks whether the ingress port 104a1, from whom a cell of the particular network packet is received, is currently assigned the token for the queue 110a.

If the particular ingress port is not holding the token for the queue, then the traffic manager drops the received cell of the particular network packet and discards any stored cells of the particular network packet (312). For example, in some implementations, the traffic manager 102 determines that the token for the queue 110a is currently assigned to the ingress port 104a2, and is therefore not held by the ingress port 104a1. Upon such a determination, the traffic manager 102 drops the cell of the network packet received from the ingress port 104a1. Additionally, if the traffic manager 102 had previously stored cells of this network packet in the packet buffer 103, the traffic manager 102 discards those cells as well, e.g., since the packet is corrupted when the newly received cells of the packet are dropped. In some implementations, traffic manager 102 performs garbage collection to free up the space in the packet buffer 103 from where the cells are discarded.

On the other hand, if the particular ingress port is holding the token for the queue, then the traffic manager checks whether cell(s) of the particular packet are already present in the packet buffer (314). For example, if the traffic manager 102 determines that the token for the queue 110a is currently assigned to the ingress port 104a1, the traffic manager 102 further checks whether one or more cells of the particular network packet received from the ingress port 104a1 are already stored in the packet buffer 103, with linking information in the queue 110a.

If cells of the particular network packet are not already stored, then the traffic manager drops the received cell of the particular network packet (316). For example, in some implementations, the traffic manager 102 determines that, even though the ingress port 104a1 is currently holding the token for the queue 110a, the particular network packet received from the ingress port 104a1 is a new packet destined for egress port 106a1, such that no cell of the particular network packet has been stored in the packet buffer 103 before the threshold value for the queue 110a was reached. Following such a determination, the traffic manager 102 drops the cell of the particular network packet that is received.

On the other hand, if the cells of the particular network packet are already stored, then the traffic manager stores the received cell of the particular network packet in the packet buffer (318). For example, if the traffic manager 102 determines that it has previously stored, in the packet buffer 103, one or more cells of the network packet for which a new cell is received from the ingress port 104a1 after the threshold value for queue 110a is reached, where the ingress port 104a1 is currently holding the token for the queue 110a, then the traffic manager admits the additional cell of the network packet received from the ingress port 104a1 and stores this cell in the packet buffer 103, and stores the linking information in the queue 110a.

The traffic manager checks whether all cells of the particular network packet are received (320). For example, the traffic manager 102 checks whether it has received all cells of the network packet for which it is storing linking information in the queue 110a after the threshold value for the queue 110a is reached.

If all cells of the particular network packet have not been received, then the traffic manager admits additional cells of the particular network packet (322). For example, the traffic manager 102 receives further cells of the particular network packet from the ingress port 104a1 that is holding the token for the queue 110a. The traffic manager 102 admits the newly received cells and stores them in the packet buffer 103, with the linking information for these cells in the queue 110a as described above, and repeats the check for additional cells of the particular network packet.

If all cells of the particular network packet have been received, then the traffic manager stores information for the received cells in a packet queue corresponding to the target egress port (324). For example, the traffic manager 102 may determine that all cells of the particular network packet have been received from the ingress port 104a1 that is holding the token for the queue 110a. Following such a determination, the traffic manager 102, stores the linking information for all the cells, which were in a receive context for ingress port 104a1, in the queue 110 corresponding to the egress port 106a1.

The traffic manager releases the token from the particular ingress port and assigns to another ingress port (326). For example, upon determining that all cells of the particular network packet have been received from the ingress port 104a1 that is holding the token for the queue 110a, the traffic manager 102 releases the token from the ingress port 104a1, and assigns the token to one of the other ingress ports, e.g., 104a2 or 104b1, in a manner as described with respect to FIG. 1.

In the above manner, using the process 300, the traffic manager performs a check for each cell of a packet that it receives. If the cell is an SOP (or SEOP) cell and the egress queue threshold is exceeded, then the cell is dropped. If a cell is a non-SOP cell (e.g., MOP or EOP), then the cell is written to buffer only if the egress queue threshold has not been reached or, if the threshold has been reached, then the ingress port from which the cell has arrived owns a token. Information for each received cell is stored in a receive context until the EOP (or SEOP) arrives and all cells have been accepted. Once the EOP arrives, the information required for linking is linked to the queue.

Figure 4:
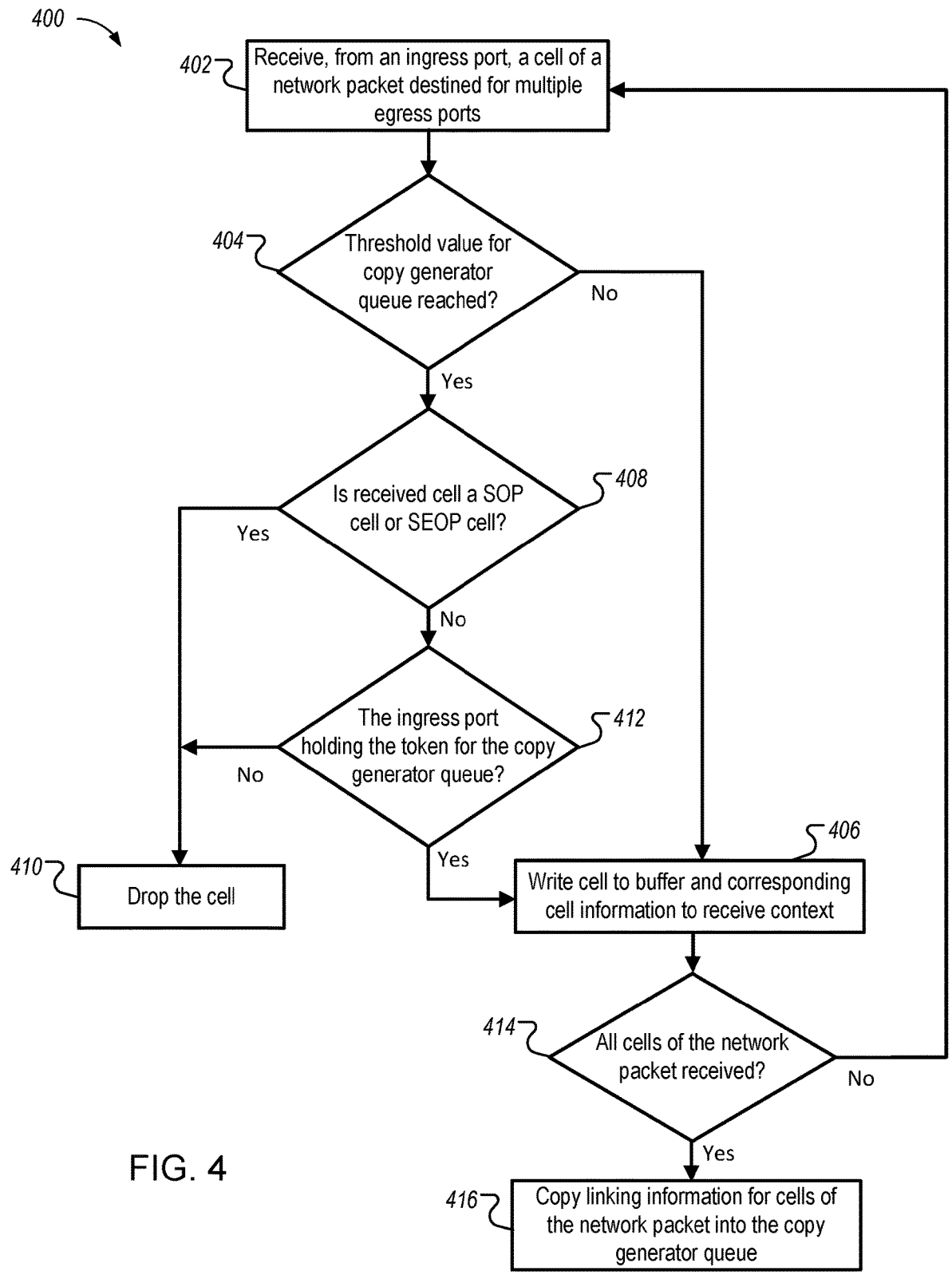
FIG. 4 illustrates an example process to store packets for replication in a multi-copy engine using tokens to manage copy generator queues.

FIG. 4 illustrates an example process 400 to store packets for replication in a multi-copy engine using tokens to manage copy generator queues. In some implementations, the process 400 is performed by the traffic manager 202 when storing linking information for cells in the multi-copy engine 212, for replication to multiple egress ports. Accordingly, the following sections describe the process 400 with respect to the traffic manager 202. However, in other implementations, the process 400 may be performed by other systems or devices.

The process 400 starts when the traffic manager receives, from an ingress port, a cell of a network packet destined for multiple egress ports (402). For example, the traffic manager 202 receives, from ingress port 204a1, a cell of a multicast packet destined for egress ports 206a1, 206a2 and 206b1.

The traffic manager checks whether the threshold value for a copy generator queue in the multi-copy engine has been reached (404). For example, in some implementations, different copy generator queues in the multi-copy engine 212 are configured to store packets of different traffic types, as described previously. To illustrate, in some cases, copy generator queues 214a and 214b are respectively configured to store multicast and broadcast packets for replication. In such cases, the traffic manager 202 checks whether the threshold value for the queue 214a has been reached. In some implementations, the traffic manager 202 may make this determination by comparing the present value of a counter value for the queue 214a, which is incremented by one every time linking information for a cell is written to the queue 214a, to a known threshold value for the queue 214a.

If the threshold value for the copy generator queue has not been reached, then the traffic manager writes the cell to a buffer and the corresponding cell information to a receive context (406). For example, in some implementations, the traffic manager 202 determines that the number of multicast cells for whom linking information is stored in the copy generator queue 214a for replication, has not reached the threshold value for the queue 214a, e.g., by checking that the value of the counter for the queue 214a is less than the threshold value for the queue 214a. Upon making such a determination, the traffic manager 202 copies the newly received cell of the multicast packet to a buffer, and the cell linking information to a receive context.

On the other hand, if the threshold value for the copy generator queue has been reached, then the traffic manager checks whether the received cell is a SOP cell or SEOP cell (408). For example, in some implementations, the traffic manager 202 determines that the threshold value for the copy generator queue 214a has been reached, e.g., the number of multicast cells that are linked in the copy generator queue 214a for replication has reached the threshold value for the queue 214a. Upon such a determination, before writing the newly received cell to the buffer, the traffic manager 202 checks whether the newly received cell is a SOP cell or SEOP cell.

If the newly received cell is a SOP cell or SEOP cell when the threshold value of the copy generator queue has been reached, then the traffic manager drops the cell (410). On the other hand, if the newly received cell is other than a SOP or SEOP cell, e.g., a MOP or EOP cell, then the traffic manager checks whether the ingress port is holding the token for the copy generator queue (412). For example, in some implementations, upon receiving a MOP or an EOP cell, the traffic manager determines that the threshold value for the copy generator queue 214a has been reached, e.g., the number of multicast cells that are linked in the copy generator queue 214a for replication has reached the threshold value for the queue 214a. In such a case, before writing the newly received MOP or EOP cell to the buffer, the traffic manager 202 checks whether the token for the queue 214a is currently assigned to the ingress port 204a1. If the traffic manager determines that the ingress port is not holding the token for the copy generator queue (412) when a MOP or EOP cell is received (following determining that the threshold value for the copy generator queue has been reached (404)), then the traffic manager drops the cell (410). In some implementations, the traffic manager 202 also discards the cells of multicast packet that are stored in the packet buffer 203, and deletes the linking information for these cells from the queue 210a. In some implementations, the traffic manager 202 performs garbage collection to free up the space occupied by these cells in the packet buffer 203, or the queue 210a, or both.

If the threshold value for the copy generator queue has not been reached (404), or the ingress port is holding the token for the copy generator queue (412) when a MOP or EOP cell is received, then the traffic manager proceeds to write the newly received cell to a buffer and corresponding cell information to a receive context (406), as described above. For example, in some implementations, upon receiving a MOP or an EOP cell, the traffic manager 202 determines that, although the threshold value for the queue 214a has been reached, the ingress port 204a1 is currently holding the token for the queue 214a. Upon making such a determination, the traffic manager 202 writes the newly received cell to a buffer, and the cell information to a receive context, for copying, at a later time, from the queue 210a to the copy generator queue 214a for further replication to the queues of the other target egress ports.

The traffic manager checks whether all cells of the network packet have been received (414). For example, following storing a newly received cell in the buffer and the corresponding cell information in a receive context, the traffic manager 202 checks if it has received all cells of the multicast packet from the ingress port 204a1.

If all cells of the network packet have not been received, then the traffic manager continues to receive and store additional cells of the network packet, as described in the preceding sections. On the other hand, if all cells of the network packet have been received, then the traffic manager proceeds to copy the linking information for the cells of the network packet into the copy generator queue (416). For example, upon receiving a cell of the multicast packet from the ingress port 204a1, the traffic manager 202 stores the cells in the packet buffer 203, and the corresponding cell information in receive context, as described above. When the newly received cell is the EOP cell for the multicast packet, the traffic manager 202 proceeds to copy the linking information for the cells of the multicast packet, using the information about the cells from the receive context, to one of the copy generator queues in the multi-copy engine 212. In some implementations, different copy generator queues in the multi-copy engine 212 are configured to store packets of different traffic types, as described previously. For example, in some cases, copy generator queues 214a and 214b are respectively configured to store multicast and broadcast packets for replication. In such cases, the traffic manager 202 proceeds to copy the linking information for the cells of the multicast packet to the copy generator queue 214a.

The processes and logic flows described in this document can be performed by one or more programmable processors executing one or more computer programs to perform the functions described herein. The processes and logic flows can also be performed by, and apparatus can also be implemented as, special purpose logic circuitry, e.g., a field programmable gate array (FPGA) or an ASIC.

Processors suitable for the execution of a computer program include, by way of example, both general and special purpose microprocessors, and any one or more processors of any kind of digital computer. Generally, a processor will receive instructions and data from a read only memory or a random access memory or both.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A device, comprising:
    a first group of ingress ports that includes a first ingress port and a second ingress port;
    a group of egress ports that includes a first egress port and a second egress port;
    a first queue for the first egress port and a second queue for the second egress port; and
    a network traffic manager including a packet buffer and coupled to the first queue and the second queue, the network traffic manager configured to:
        receive, from the first ingress port in the first group of ingress ports, a cell of a first network packet destined for the first egress port, wherein the first network packet comprises a plurality of cells;
        determine whether a number of cells stored in the first queue is at least equal to a first threshold value;
        in response to determining that the number of cells stored in the first queue is at least equal to the first threshold value, determine whether the first ingress port has been assigned a first queue token corresponding to the first queue;
        upon determining that the first ingress port has been assigned the first queue token:
            determine whether one or more other cells of the first network packet are stored in the packet buffer, and
            in response to determining that one or more other cells of the first network packet are stored in the packet buffer:
                store the received cell in the packet buffer, and
                store linking information for the received cell in a receive context, wherein the receive context further includes linking information for the one or more other cells of the first network packet;
            determine whether all cells of the first network packet have been received; and
            in response to determining that all cells of the first network packet have been received:
                copy linking information for the cells of the first network packet from the receive context to one of the first queue or a copy generator queue, and
                release the first queue token from the first ingress port.

2. The device of claim 1, wherein the network traffic manager is further configured to:
    receive, from the second ingress port, a particular cell of a second network packet destined for the second egress port, wherein the second network packet comprises a plurality of cells;
    determine that a number of cells stored in the second queue is at least equal to a second threshold value;
    in response to determining that the number of cells stored in the second queue is at least equal to the second threshold value, determine that the second ingress port is not currently assigned a second queue token corresponding to the second queue; and
    upon determining that the second ingress port is not currently assigned the second queue token, drop the particular cell of the second network packet and discard any cell of the second network packet stored in the packet buffer.

3. The device of claim 2, wherein the network traffic manager is further configured to:
    receive, from the second ingress port, an additional cell of the second network packet subsequent to receiving the particular cell of the second network packet; and
    drop the additional cell of the second network packet.

4. The device of claim 1, wherein the network traffic manager is further configured to:
    receive, from the second ingress port, a cell of a second network packet destined for the first egress port, wherein the cell of the second network packet is received after the first threshold value is reached;
    in response to determining that the number of cells stored in the first queue is at least equal to the first threshold value, determine whether the second ingress port has been assigned the first queue token; and
    upon determining that the second ingress port is not currently assigned the first queue token, drop the received cell of the second network packet.

5. The device of claim 4, further comprising:
    upon determining that the second ingress port is currently assigned the first queue token, determine whether one or more other cells of the second network packet are present in the packet buffer; and
    upon determining that one or more other cells of the second network packet are present in the packet buffer:
        store the received cell of the second network packet in the packet buffer, and
        store linking information for the cell of the second network packet in a second receive context corresponding to the second network packet, wherein the second receive context further includes linking information for the one or more other cells of the second network packet.

6. The device of claim 1, wherein the first group of ingress ports includes a third ingress port and
    wherein the network traffic manager is further configured to:
    upon releasing the first queue token from the first queue, assign the first queue token to the second ingress port and the third ingress port in a known order, wherein each ingress port is in possession of the first queue token for a configurable period of time.

7. The device of claim 6, wherein assigning the first queue token to the second ingress port and the third ingress port comprises:
determining whether the second ingress port and the third ingress port are actively sending cells of network packets for the first egress port;
conditioned on determining that the second ingress port is actively sending cells of network packets for the first egress port, assigning the first queue token to the second ingress port; and
conditioned on determining that the second ingress port is not actively sending cells of network packets for the first egress port and the third ingress port is actively sending cells of network packets for the first egress port, assigning the first queue token to the third ingress port.

8. The device of claim 7, wherein the traffic manager is further configured to:
conditioned on determining that the second ingress port and the third ingress port are not actively sending cells of network packets for the first egress port, but the first ingress port is actively sending cells of network packets for the first egress port, reassign the first queue token to the first ingress port.

9. The device of claim 6, wherein assigning the first queue token to the second ingress port and the third ingress port in the known order further comprises:
periodically readjusting the order for assigning the first queue token to the ingress ports.

10. The device of claim 1, wherein determining whether the first threshold value corresponding to the first queue is reached further comprises:
in response to determining that the number of cells stored in the first queue is less than the first threshold value:
store the received cell in the packet buffer, and
store linking information for the received cell in the receive context.

11. The device of claim 1, wherein determining whether the first ingress port has been assigned the first queue token further comprises:
upon determining that the first ingress port has not been assigned the first queue token, drop the received cell of the first network packet and discard any cells of the first network packet stored in the packet buffer.

12. The device of claim 1, further comprising a multi-copy engine that includes a first copy generator queue for multicast traffic and a second copy generator queue for another traffic type, wherein the first network packet is a unicast packet, and wherein the network traffic manager is further configured to:
receive, from the first ingress port, a multicast cell of a multicast packet destined for the first egress port and the second egress port;
determine whether a number of cells linked in the first copy generator queue is at least equal to a first copy threshold;
upon determining that the number of cells linked in the first copy generator queue is at least equal to the first copy threshold, determine whether the received multicast cell is one of a start of packet (SOP) cell or a start and end of packet (SEOP) cell;
upon determining that the received multicast cell is different from a SOP cell or a SEOP cell, determine whether the first ingress port is currently assigned a first copy token corresponding to the first copy generator queue; and
upon determining that the first copy token is currently assigned to the first ingress port:
store the received multicast cell in a buffer, and
write linking information for the received multicast cell to a receive context for the multicast packet, wherein the receive context further includes linking information for other cells of the multicast packet previously received.

13. The device of claim 12, further comprising:
determine whether all cells of the multicast packet have been received; and
upon determining that all cells of the multicast packet have been received, copy linking information for all the cells of the multicast packet from the receive context to the first copy generator queue.

14. The device of claim 12, wherein determining whether the number of cells linked in the first copy generator queue is at least equal to the first copy threshold further comprises:
upon determining that the number of cells linked in the first copy generator queue is less than the first copy threshold, store the received multicast cell in the buffer, and write the linking information for the received multicast cell to the receive context.

15. The device of claim 12, wherein determining that the received multicast cell is one of a SOP or SEOP cell further comprises:
upon determining that the received multicast cell is one of a SOP cell or a SEOP cell, drop the cell.

16. The device of claim 12, wherein determining whether the first ingress port is currently assigned the first copy token further comprises:
upon determining that the first copy token is not currently assigned to the first ingress port:
drop the received multicast cell, and
discard other cells of the multicast packet previously stored in the buffer.

17. A method performed by a network traffic manager of a device, the method comprising:
receiving, from a first ingress port in a first group of ingress ports of the device, a cell of a first network packet destined for a first egress port of a group of egress ports of the device, wherein the first network packet comprises a plurality of cells;
determining whether a number of cells stored in a first queue for the first egress port is at least equal to a first threshold value;
in response to determining that the number of cells stored in the first queue is at least equal to the first threshold value, determining whether the first ingress port has been assigned a first queue token corresponding to the first queue;
upon determining that the first ingress port has been assigned the first queue token:
determining whether one or more other cells of the first network packet are stored in a packet buffer included in the network traffic manager, and
in response to determining that one or more other cells of the first network packet are stored in the packet buffer:
storing the received cell in the packet buffer, and
storing linking information for the received cell in a receive context, wherein the receive context further includes linking information for the one or more other cells of the first network packet;

determining whether all cells of the first network packet have been received; and in response to determining that all cells of the first network packet have been received:
copying linking information for the cells of the first network packet from the receive context to one of the first queue or a copy generator queue, and
releasing the first queue token from the first ingress port.

18. The method of claim 17, further comprising:
receiving, from a second ingress port of the first group of ingress ports, a particular cell of a second network packet destined for a second egress port of the group of egress ports, wherein the second network packet comprises a plurality of cells;
determining that a number of cells stored in a second queue for the second egress port is at least equal to a second threshold value;
in response to determining that the number of cells stored in the second queue is at least equal to the second threshold value, determining that the second ingress port is not currently assigned a second queue token corresponding to the second queue; and
upon determining that the second ingress port is not currently assigned the second queue token, dropping the particular cell of the second network packet and discarding any cell of the second network packet stored in the packet buffer.

19. The method of claim 18, further comprising:
receiving, from the second ingress port, an additional cell of the second network packet subsequent to receiving the particular cell of the second network packet; and
dropping the additional cell of the second network packet.

20. The method of claim 17, further comprising:
receiving, from a second ingress port of the first group of ingress ports, a cell of a second network packet destined for the first egress port, wherein the cell of the second network packet is received after the first threshold value is reached;
in response to determining that the number of cells stored in the first queue is at least equal to the first threshold value, determining whether the second ingress port has been assigned the first queue token; and
upon determining that the second ingress port is not currently assigned the first queue token, dropping the received cell of the second network packet.

21. The method of claim 20, further comprising:
upon determining that the second ingress port is currently assigned the first queue token, determining whether one or more other cells of the second network packet are present in the packet buffer; and
upon determining that one or more other cells of the second network packet are present in the packet buffer:
storing the received cell of the second network packet in the packet buffer, and
storing linking information for the cell of the second network packet in a second receive context corresponding to the second network packet, wherein the second receive context further includes linking information for the one or more other cells of the second network packet.

22. The method of claim 17, further comprising:
upon releasing the first queue token from the first queue, assigning the first queue token to a second ingress port and a third ingress port of the first group of ingress ports in a known order, wherein each ingress port is in possession of the first queue token for a configurable period of time.

23. The method of claim 22, wherein assigning the first queue token to the second ingress port and the third ingress port comprises:
determining whether the second ingress port and the third ingress port are actively sending cells of network packets for the first egress port;
conditioned on determining that the second ingress port is actively sending cells of network packets for the first egress port, assigning the first queue token to the second ingress port; and
conditioned on determining that the second ingress port is not actively sending cells of network packets for the first egress port and the third ingress port is actively sending cells of network packets for the first egress port, assigning the first queue token to the third ingress port.

24. The method of claim 23, further comprising:
conditioned on determining that the second ingress port and the third ingress port are not actively sending cells of network packets for the first egress port, but the first ingress port is actively sending cells of network packets for the first egress port, reassigning the first queue token to the first ingress port.

25. The method of claim 22, wherein assigning the first queue token to the second ingress port and the third ingress port in the known order further comprises:
periodically readjusting the order for assigning the first queue token to the ingress ports.

26. The method of claim 17, wherein determining whether the first threshold value corresponding to the first queue is reached further comprises:
in response to determining that the number of cells stored in the first queue is less than the first threshold value:
storing the received cell in the packet buffer, and
storing linking information for the received cell in the receive context.

27. The method of claim 17, wherein determining whether the first ingress port has been assigned the first queue token further comprises:
upon determining that the first ingress port has not been assigned the first queue token, dropping the received cell of the first network packet and discard any cells of the first network packet stored in the packet buffer.

28. The method of claim 17, further comprising:
receiving, from the first ingress port, a multicast cell of a multicast packet destined for the first egress port and a second egress port of the group of egress ports;
determining whether a number of cells linked in a first copy generator queue included in a multi-copy engine of the device is at least equal to a first copy threshold, wherein the first copy generator queue is for storing multicast traffic;
upon determining that the number of cells linked in the first copy generator queue is at least equal to the first copy threshold, determining whether the received multicast cell is one of a start of packet (SOP) cell or a start and end of packet (SEOP) cell;
upon determining that the received multicast cell is different from a SOP cell or a SEOP cell, determining whether the first ingress port is currently assigned a first copy token corresponding to the first copy generator queue; and
upon determining that the first copy token is currently assigned to the first ingress port:

storing the received multicast cell in a buffer, and writing linking information for the received multicast cell to a receive context for the multicast packet, wherein the receive context further includes linking information for other cells of the multicast packet previously received.

29. The method of claim 28, further comprising:

determining whether all cells of the multicast packet have been received; and upon determining that all cells of the multicast packet have been received, copying linking information for all the cells of the multicast packet from the receive context to the first copy generator queue.

30. The method of claim 28, wherein determining whether the number of cells linked in the first copy generator queue is at least equal to the first copy threshold further comprises:

upon determining that the number of cells linked in the first copy generator queue is less than the first copy threshold, storing the received multicast cell in the buffer, and writing the linking information for the received multicast cell to the receive context.

31. The method of claim 28, wherein determining that the received multicast cell is one of a SOP or SEOP cell further comprises:

upon determining that the received multicast cell is one of a SOP cell or a SEOP cell, dropping the cell.

32. The method of claim 28, wherein determining whether the first ingress port is currently assigned the first copy token further comprises:

upon determining that the first copy token is not currently assigned to the first ingress port:

dropping the received multicast cell, and discarding other cells of the multicast packet previously stored in the buffer.

* * * * *